US005408217A

United States Patent [19]

Sanderford, Jr.

[11] Patent Number: 5,408,217

[45] Date of Patent: Apr. 18, 1995

[54] SECURE FIRE/SECURITY/SENSOR TRANSMITTER SYSTEM

[75] Inventor: Hugh B. Sanderford, Jr., New Orleans, La.

[73] Assignee: Sanconix, Inc., New Orleans, La.

[21] Appl. No.: 210,431

[22] Filed: Mar. 21, 1994

[51] Int. Cl.[6] ........................ G08B 29/00; G05B 19/02

[52] U.S. Cl. .................................... 340/506; 340/518; 340/825.69; 340/825.72; 340/825.22; 340/825.5

[58] Field of Search ............... 340/506, 505, 517, 518, 340/825.06, 825.31, 825.22, 825.69, 825.72, 825.5

[56] References Cited

U.S. PATENT DOCUMENTS

| | | | |
|---|---|---|---|
| 4,228,424 | 10/1980 | Le Nay et al. | 340/506 |
| 4,465,904 | 8/1984 | Gottsegen et al. | 340/518 |
| 4,535,333 | 8/1985 | Twardowski | 340/825.22 |
| 4,581,606 | 4/1986 | Mallory | 340/505 |
| 4,855,713 | 8/1989 | Brunius | 340/506 |
| 4,972,183 | 11/1990 | Kuhlmann et al. | 340/825.22 |
| 5,099,233 | 3/1992 | Keenan | 340/825.22 |
| 5,259,029 | 11/1993 | Duncan, Jr. | 340/825.31 |

*Primary Examiner*—Donnie L. Crosland
*Attorney, Agent, or Firm*—Joseph T. Regard Ltd.

[57] ABSTRACT

A system for preventing unauthorized access to the programming and control features of a fire/security/-control systems remote sensors. The exemplary embodiment of the present invention utilizes an association of transmitter identity/address with a central processor/-control fire/security data base, which in turn is configured to securely program each transmitter with its location and function, or "personality". The various, individual sensors and central processor/control unit communicate individually via individual, repeatable pseudo randomization algorithms, producing a several bit result. The communicating central processor/control and each sensor must have a match on outgoing/incoming code before the transmitting sensor will accept the programming on its personality. The exemplary embodiment of the present invention also utilizes a randomization seed, which can altered occasionally, to further increase security.

38 Claims, 5 Drawing Sheets

SECURE FIRE/SECURITY/SENSOR TRANSMITTER SYSTEM

BACKGROUND OF THE INVENTION

1. Invention Field

The present invention relates to security/fire/control systems, and more particularly to a system for preventing unauthorized access to the programming and control features of a fire/security system's remote sensors. The exemplary embodiment of the present invention utilizes an association of transmitter identity/address with a central processor fire control panel/security data base, which in turn is configured to securely program each transmitter with its location and function, or "personality".

The various, individual sensors and central processor/control unit communicate individually via individual, repeatable pseudo randomization algorithms, producing a several bit result. The communicating central processor/control and each sensor must have a match on outgoing/incoming code before the transmitting sensor will accept the programming on its personality. The exemplary embodiment of the present invention also utilizes a randomization seed, which can altered occasionally, to further increase security.

2. General Background Discussion

Most security systems configured for monitoring a perimeter utilize a plurality of individually programmed, remote sensors along said perimeter, with each of said sensors configured to communicate with a central processor/control unit via electromagnetic or optical link or the like. A recognized problem with such system rests with the integrity of the remote sensors, as alteration of their program can be utilized as a method of violating security.

A list of prior patents which may be of interest is presented below:

| U.S. Pat. No. | Patentee(s) | Issue Date |
|---|---|---|
| 4,855,713 | Brunius | 08/08/1989 |
| 4,581,606 | Mallory | 03/08/1986 |

The '713 patent to Brunis teaches a "Learn Mode Transmitter", teaching a security system whereby a central processing unit self learns the identities of its distributed transmitter sensors, each of said transmitters containing signal conditioning data and a pseudo randomly programmed identity code.

The '713 patent, however, requires that each transmitter be pre-programmed at the factory, which further requires the utilization of additional non-volatile ram or burned-in PROM, which is not required by the present invention. Further if standard, volatile RAM is utilized in lieu of the above, the transmitter must be powered from its time of programming at the factory, via battery and any interruption in power due to burn out of the power supply or battery will result in loss of programming data, and the need for re-programming.

Further, it is believed that the '713 system requires extra modes in order to prevent the transmitters from continually transmitting while in shipment, not only to conserve batteries, but also to prevent dangerous conditions such transmissions may cause when in close proximity or aboard airplanes and the like. Such systems, if not deactivated in transport, have been known to cause false alarms in the security systems of the storage facility, etc.

In addition, if the pre-programmed transmitter of the '713 system were found to be in conflict with an existing programmed address after installation, it must be removed from the system and returned, as the address is fixed, unlike the present invention, as will be further discussed infra.

The '606 patent to Mallory teaches a "Central Monitor for Home Security System" wherein there is taught a system wherein each of the transmitters is programmed with individual information data, which is fed back to the central monitor during an alarm, which is matched with the data in the central monitor's memory for a match, which establishes the monitor and nature of the alarm.

However, the '606 device can be programmed by any unsecured, unauthorized programming device, since no scrambling or authorized identification mode is required; nor does said system contemplate a means to alter access codes for programming of transmitters.

Further, the '606 device requires the utilization of a programming wire which can easily be compromised (unlike the present invention), and which may not be removable when transmitters require magnetic, electromagnetic, or optical means of communication.

There is no JAM command provided with the Mallory device, so a similar programming device to that originally utilized in setting up the system may be later reconnected by an unauthorized user in reprogramming the system, compromising security.

Further, since there is no JAM command provided, the only way for the transmitter to achieve the secure mode of operation against future re-programming is the enclose the electrical programming pins in a secure housing with the addition of a tamper warning sensor, which then transmits the appropriate message, requiring additional hardware, software, and costs, and still do not provide absolute security. This method would also not work in conjunction with a system relying upon non-wire transmission such as magnetic, electromagnetic, or optical transmitter programming means, as it would be impossible to "disconnect" such means fully, and transmission of same for unauthorized programming could occur at a great distance.

Lastly, Mallory has no provision of verifying the data being transferred to the transmitter, either by conversion of scrambling bits or via the re-transmission of programmed information.

3. Summary Discussion of the Invention

The present invention overcomes these prior art problems by providing a system wherein there is provided an association of transmitter identity/addresses with the central monitoring panel, which in turn is configured to securely program each transmitter with its location and function, or "personality".

The present invention is typically utilized with fire/security/control systems, which includes a central monitoring panel interfacing with a plurality of external sensors. The sensors may be configured to provide a wide variety of information in the form of monitoring for smoke, temperature flux, motion or heat detection, intrusion, water flow detection or monitoring, voice dispatch, voltage level monitoring, power meter monitoring, or the like. Other applications may further include time and attendance accounting, building or home automation, process control, remote terminal programming, and the like.

Each of the above receivers in the present embodiment of the invention communicates via wire, radio, or optically with one or more receivers, relaying said information to the fire/security panel, which has the capacity to process said information according to the program, and act upon said information in the appropriate manner.

Each of said sensors must be set up with PERSONALITY information, assigning an identity of the unit amongst the other components in the system, as well as a function, appropriate response, and communication parameters and protocol, including identification/address bits, property/system code(s), frequency channel or spread spectrum channel, transmission timing, as well as input condition(s) and calibration.

It is essential that this initial programming of personality information be accurate and secure, as unauthorized future alteration of same thereafter can be utilized as a means of violating system integrity. The present invention discloses a system for insuring data security, and for preventing unauthorized alteration of the personality program of the sensors, once installed and set.

It is thus an object of the present invention to provide a system for the secure initial programming of sensory nodes in the sensory array of a monitoring/access/fire/-security/control system.

It is another object of the present invention to provide a system for securely setting up and communicating with programmable remote components of various data arrays.

It is yet another object of the present invention to provide a system for securing individual sensory nodes in a sensory/transmitter and central processor/receiver arrangement.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE INVENTION

The present invention uses several unique methods to cause an association of transmitter identity/address with a fire/security panel data base, which in turn contains transmitter location and function, typically for a plurality of individual transmitters forming a monitoring sensor array. The goals of such a process are as follows:

1. The process must be simple to perform in any field/installation related work.
2. The process must be economical and readily manufacturable.
3. The programming process and the resulting transmitter to panel association must be secure.
4. The process must not be able to be accomplished by an unauthorized person.
5. The process must not be able to be compromised once the transmitter to panel association is made.

Figure 4:
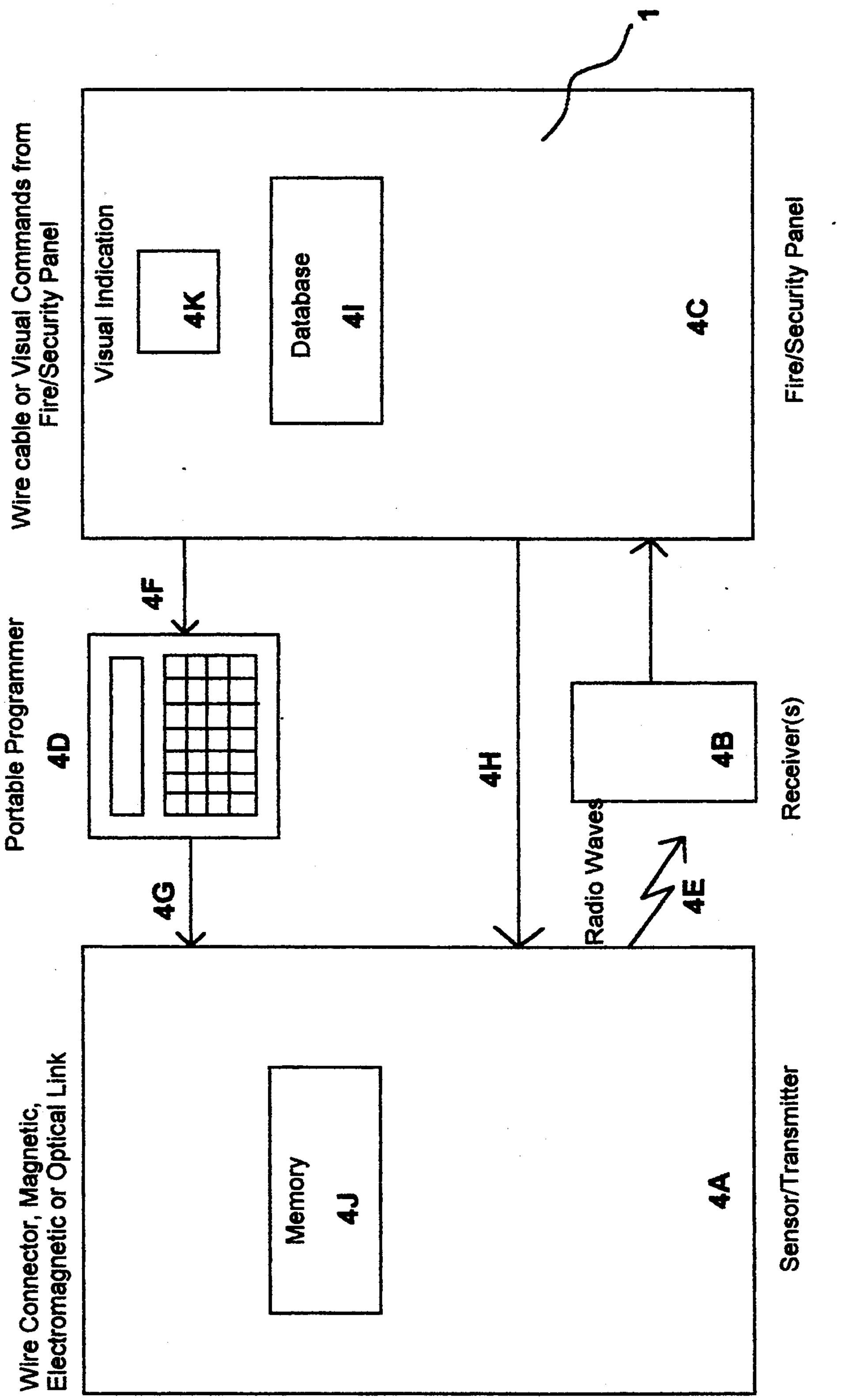
FIG. 4 is a block diagram of the system of programming the sensor/transmitter(s) comprising the secure sensor/transmitter array of FIG. 1.

By way of these methods, the fire/security panel causes the TRANSMITTER to be programmed. The transmitters are all manufactured with NO or little initial "personality" or address/identification built in. Referring to FIG. 4, the fire/security panel 1, by contrast, includes a data base 41 which contains the desired transmitter personality data, as well as, the address/device ID bits for each said transmitter.

Such personality data can be any combination of: transmitter TYPES, such as passive infrared, smoke detector, keypad, contact input, etc; transmitter PROPERTY/SYSTEM code which is common to all elements of a system to prevent adjacent but separate systems from interfering with one another; FREQUENCY CHANNEL or SPREAD SPECTRUM CDMA CODE which is also typically common to all elements of a system for the same reason; there are also programmable functioning such as number of redundant alarm transmissions, alarm transmission separation, supervision interval timing, calibration factors and the like; there is also sensor input condition such as normally open/normally closed charge detect, debounce time, cut alarm wire detection or the like.

The greater this programmable personality information becomes, the more subtle the effects of unauthorized re-programming are and as a result, the more secure the programming method must be.

Each transmitter must be programmed with this information in order for it to function in the system. Returning to FIG. 4, the fire/security panel 4C is connected to the transmitter 4A either directly through a wire cable 4H or through an intermediate handheld programmer 4D via link 4F which programmer is then connected to the transmitter 4A through a wire cable 4G. The handheld programmer can be either electrically programmed by the fire/security panel or operator. The programmer can receive data and provide visual indicia via the fire/security panel 4K, to key in programming commands handheld programmer 4D.

Figure 3A:
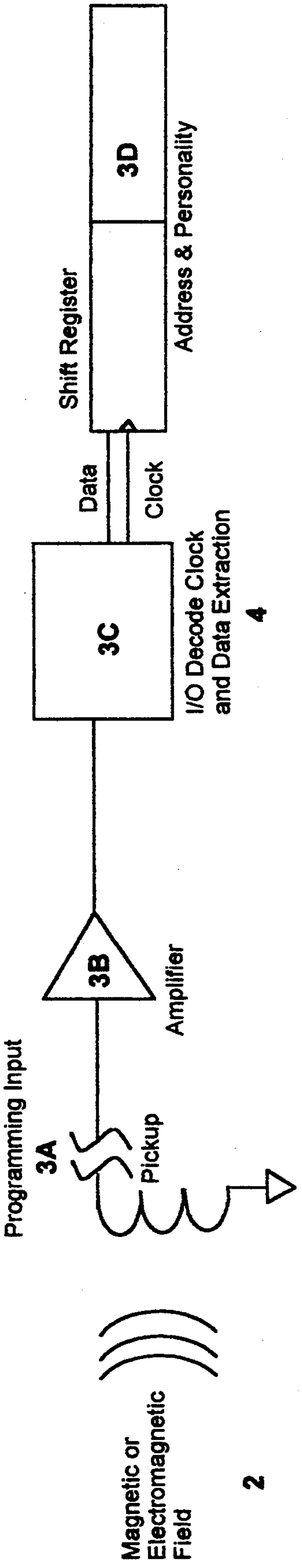
FIG. 3 is a diagram of the programming input schematic of the secure sensor/transmitter array of FIG. 1.
Figure 3B:
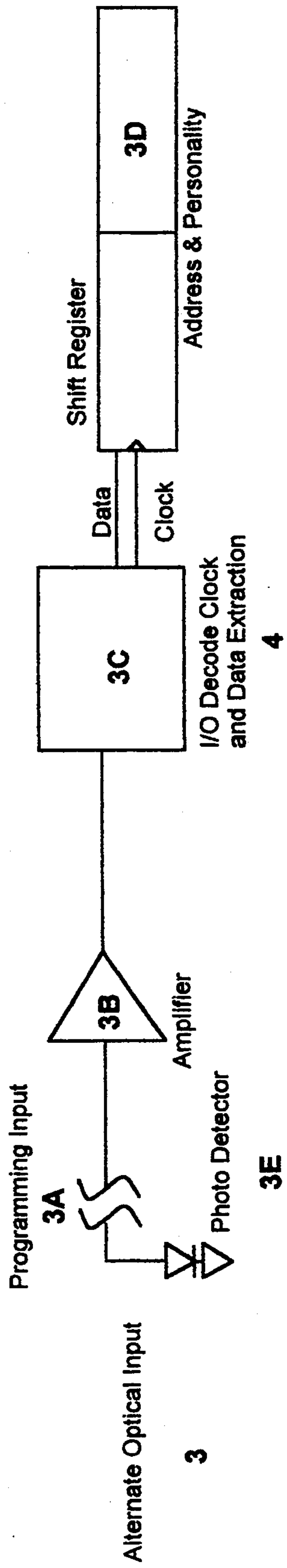

Alternately, an electromagnetic field 2 or optical data link 3 can replace the wire cable, as shown in FIG. 3. The electromagnetic or optical programming would be facilitated by a magnetic, electromagnetic 3A or optical 3E pick-up device. Those received signals are amplified by amplifier 3B. Additionally, amplifier 3B can be biased into a very low current or no current state to reduce power. This has the desirable effect of requiring a larger peak to peak voltage swing on pickup 3A. This forces a programming device to be passively closed to a sensor element and reduces the chance of tampering or unauthorized operation. The output of amplifier 3B is then decoded by I/O decoder 3C to determine 1/0 logic levels, as well as, both clock and data information 4. Many such methods are commonly available including ratio encoding, Manchester encoding, Non-Return to Zero (NRZ) encoding, or the like; alternatively, a VART type approach can be used. Once so convened, clock and data signals containing the serial programming information bits are passed to memory means 3D.

Any of these connection means resultingly provides a logical link from the fire/security/control panel's internal data base 41 to the sensor/transmitter 4A to be programmed, as shown in FIG. 4.

Figure 5:
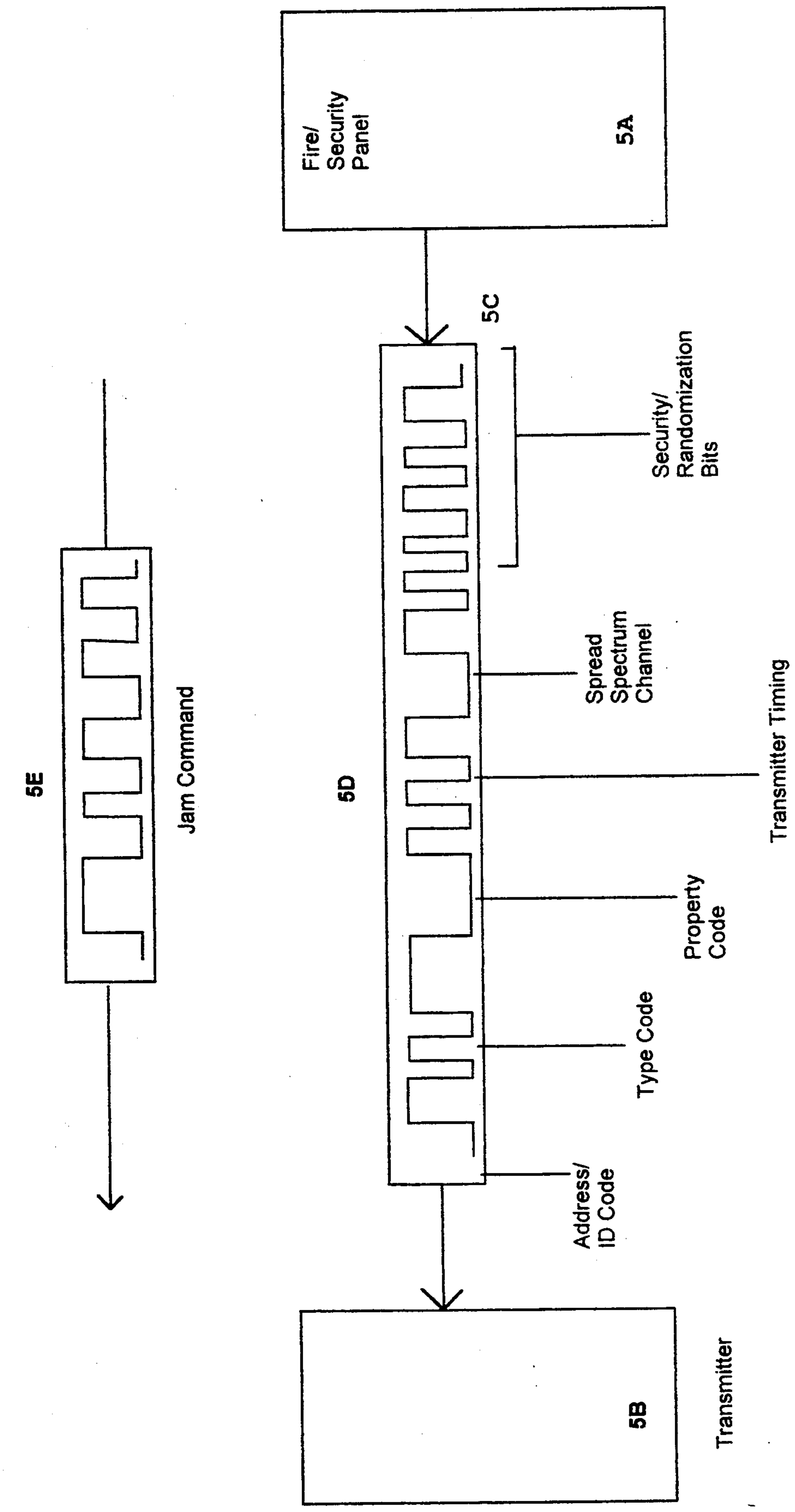
FIG. 5 is a block diagram of the jam command and security/randomization bits of the secure sensor/transmitter array of FIG. 1.

Continuing with FIG. 4, prior to programming, the fire/security/control panel 4C chooses the necessary programmable transmitter functions and stores them into its data base 41. Next, a transfer of the fire/security panel desired programming must be sent to the transmitter 4A. In order to insure that an unauthorized user cannot connect into and program the transmitter 4A the following procedure is used:

Both the transmitter 4A and receiver 4B contain an identical, repeatable pseudo randomization algorithm in ROM or in ASIC logic. Referring to FIG. 5, the algorithm is applied to outgoing programming data 5D from the fire/security panel 5A and produces a number of security/randomization bits 5C which are appended to the outgoing programming message or message 5D and sent to the transmitter 5B.

Figure 1:
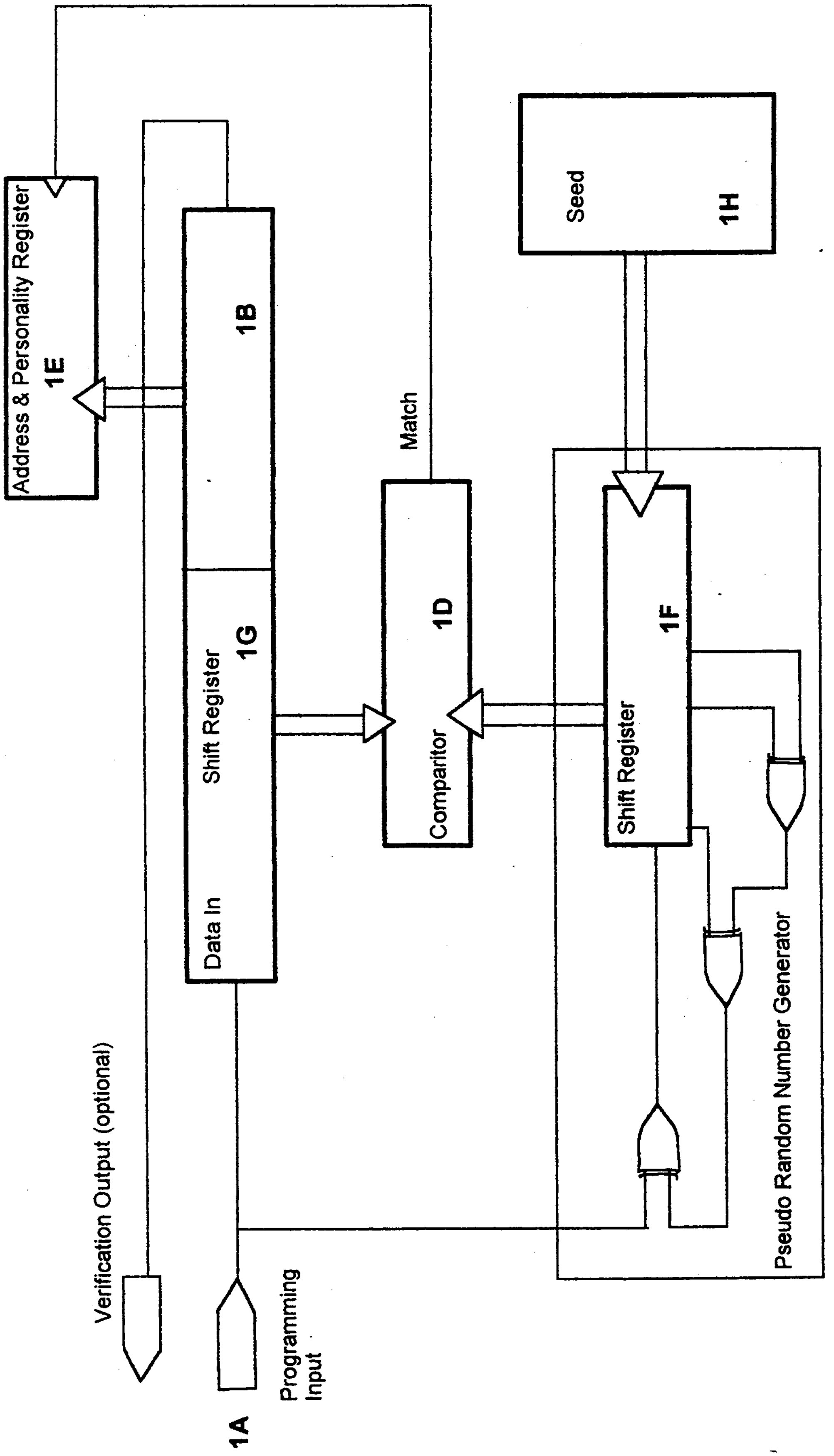
FIG. 1 is a logic circuit diagram of the sensor/transmitter programming input schematic of the preferred embodiment of the secure sensor/transmitter array of the present invention.

Referring to FIG. 1 the transmitter likewise applies this pseudo randomization algorithm as the security/-randomization bits (FIG. 5, element 5C) to the outgoing programming data (FIG. 5, element 5D), now forming the incoming programming data 1A to the transmitter (FIG. 5, element 5B) and produces a several bit result in the shift register 1F. The scrambling algorithm is devised such that a small difference in the programming bit stream causes a great difference in the pseudo randomization result. The present invention uses a 16 bit polynomial to produce this pseudo randomization.

Before the transmitter will accept this programming, stored in the address and personality register 1E, both the pseudo random code, stored in the data in shift register 1G from the fire/security panel and the transmitter, in shift register 1F must match via comparator 1D, indicating unauthorized acceptance use. In addition to insuring authorized access, this process also insures that the-data itself is correct. The longer the polynomial sequence used, the greater the security.

To further increase security of the fire/security/control system, not all systems have to operate on the same randomization code. The randomization seed 1H can be altered occasionally. This would further prevent the theft of a programming device from providing an avenue to potentially compromise already installed fire/-security systems. Methods may be established from time to time to change the SEED 1H of the pseudo randomization algorithms to further increase security. The present invention uses a complex polynomial to produce the desired randomization which includes a base randomization SEED 1H. Alternatively, a less secure system could use a simple numeric sum of the bits or sum of the bytes.

Returning to FIG. 4, once the transmitter 4A accepts the programming as correct, it then either transmits 4E one or more verification messages or repeats its programming through the electric, magnetic or optical link 4G, 4H. In this manner the fire/security data base can match and verify 100% correctness of the desired program.

Once the programming connection is established with the transmitter, this link can also be used to aid in production of the transmitter. For example, special program commands can be used to test battery low or help automated tuning of transmitter elements. Further, this feature can be used in the field to insure full functionality of the device prior to installation.

An alternative embodiment of the present invention, wherein the transmitter would provide the security/-randomization code, could work as follows:

a. placing an unprogrammed transmitter in near proximity to an unprogrammed fire/security receiver;

b. said receiver set into a mode by which it can accept programming data via transmitted programming information from said transmitter;

c. limiting the signal strength of said transmitter to a near proximity of the receiver or by way of a special bit in the transmitted message signifying that the message is a programming message;

d. said transmitter having a random number means for generating random numbers;

e. selectively generating a security/randomization bit for said transmitter by initiating said random number generator, and designating said random number generated as said security/randomization bit, and transmitting said bit to said receiver;

f. said receiver imputing programming message and determining if such a device ID/address already exists in the system;

g. if said new device ID/address is acceptable it becomes internally associated by the receiver or security/fire panel with the appropriate transmitter;

h. if the new device ID/address is not acceptable the receiver or fire/security panel so makes an appropriate indication;

i. step e is repeated until step h is met, once met the transmitter is removed from the programming mode.

The above method could include the additional step after step "e" of the receiver inputting said transmission and appending said security/randomization bit to programming data including new device ID/address, forming a programming message, and transmitting said programming message to said transmitter.

A programming button for initializing said random number generator as set forth in step "e"; in such an embodiment said programming button for generating said random number generator feature may be configured to reprogram after its use as a random number generator, to allow said switch to be utilized to program the spread spectrum code or frequency channel or the like, by depressing said button in increments for selecting the desired channel. For example, five depressions of the button could change the selected channel from one to five.

In such an embodiment, the ability to disable said programming button in order to prevent further tampering of the receiver once programmed would be desirable; such a means to disable could include, for example, switching the input protocol into a loop, preventing further input from said button.

Said programming button might also be utilized to set the transmitter type code in the transmitter for transmission to the receiver.

It is possible, in some applications, that the wire programming link or the magnetic field or optical programming link WILL NOT or COULD NOT be disconnected. Further, it is important that an unauthorized person COULD NOT AT A FUTURE POINT, after the initial programming of the transmitter, alter that programming by simple reconnection of a programming cable. If the transmitter became re-programmed it would be possible for the transmitter to create false or unrecognizable information which would render the fire/security system ineffective. This is especially true of more sophisticated systems which require extensive programmability of sensor/transmitter personality.

Figure 2:
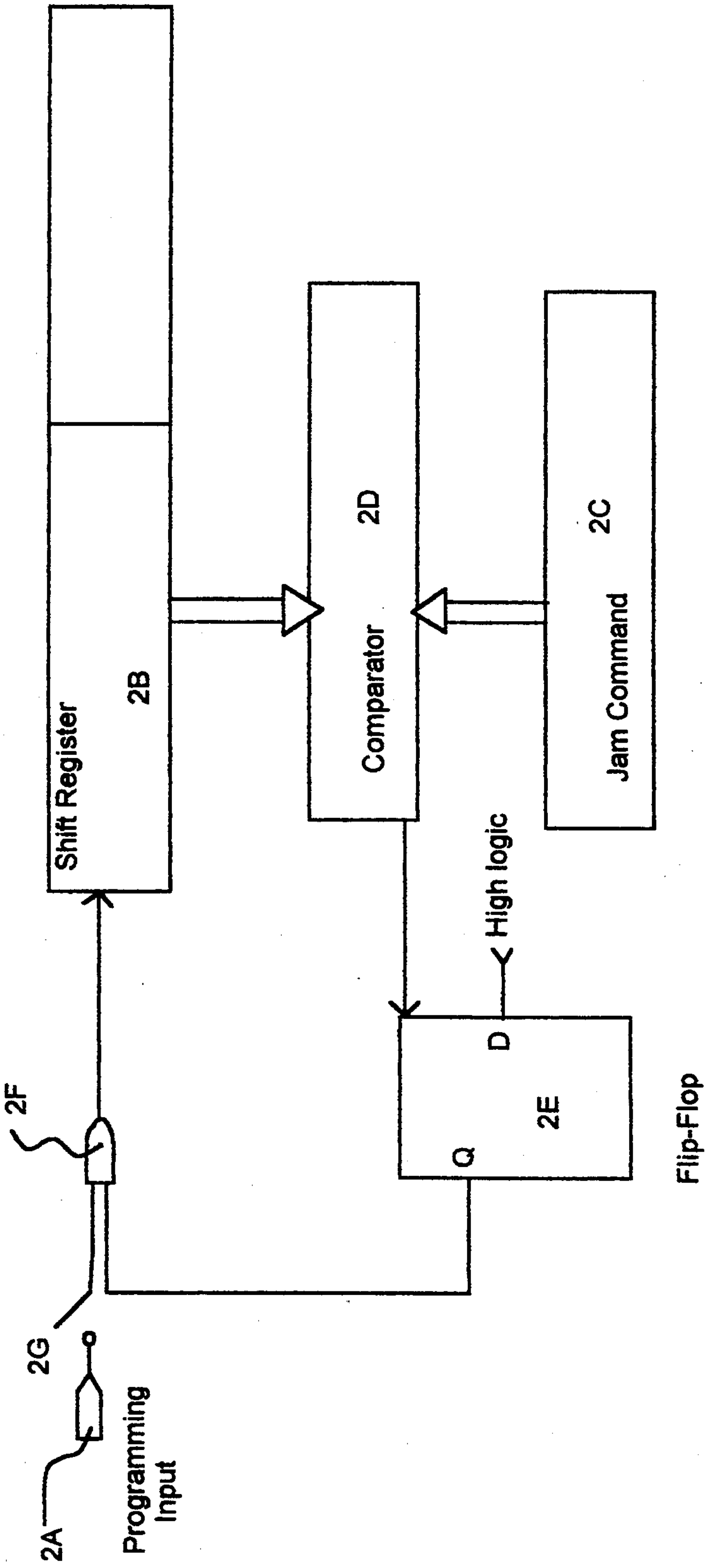
FIG. 2 is a logic circuit of the jam command logic circuit schematic of the secure sensor/transmitter array of FIG. 1.

To facilitate these essential needs, the present invention provides a "JAM" 2C function, as illustrated in FIG. 2. Once the fire/security panel verifies that the transmitter programming is indeed correct, a "JAM" command (FIG. 5, 5E) can be sent. The incoming programming message is stored in memory means 2B as shown in FIG. 2. Referring again to FIG. 5, the programming message is compared to a unique bit pattern 5C which represents the JAM command. Referring again to FIG. 2, once a match is verified 2D, the JAM command is permanently latched into flip-flop 2E. Alternatively, a fused link, EAROM, PROM or the like could be utilized. The JAM command logically disconnects the programming connection via logic circuit 2F so that future incoming programming commands via programming input 2A will be ignored. Alternatively, the JAM command could be replaced or augmented by a switch 2G or a jumper located within the transmitter which disconnects the incoming programming commands via programming input 2A.

Once the JAM sequence is initiated, any future attempt to compromise the system will be thwarted. This feature is ESSENTIAL for programming links which CANNOT BE DISABLED such as magnetic, electromagnetic or optical links. Magnetic, electromagnetic, or optical waves can effectively travel at great distances and would allow an unauthorized programmer off-sight ability to compromise the fire/security/control system without detection.

As a further safeguard, it would be possible to additionally encrypt the programming message itself. This would provide increased security when programming using the magnetic, electromagnetic or optical links.

The optical or magnetic means of imputing programming do not have to directly interface with a portable programmer or with a fire/security panel. Instead those inputs could directly sense the information contained on an optical or magnetic bar code or the like or the H field information on a magnetic strip.

In this manner, the bar code or magnetic strip could be coded or printed either at the time of manufacture, or at the time of installation and be optionally affixed to the fire/security sensor itself. Alternately, a sheet of preprogrammed bar codes with their associated meaning could be produced and distributed to fire/security system installers. In this manner the installer need only choose the appropriate personality features and addresses and pass them by the magnetic or optical input of the sensor. As a further option an electricity detachable bar code wand could be used to input the bar codes or magnetic strip.

Such a programming method has the advantage of needing no portable programmer, it is a non-volatile storage means and needs no electrical connection. The bar code or magnetic strip need only be passed by the magnetic or optical programming input of the sensors. A second bar code with the JAM command could then terminate potential future programming.

All of the disclosed methods can be implemented as direct hardware blocks or with microprocessor software or with micro-coded state generators or the like.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. The method of programming a sensor in a secure manner, comprising the steps of:

a. providing a programming station containing in memory sensor identification and function information comprising programming data bits, said programming station further containing in memory a scrambling algorithm;

b. providing an sensor containing in memory a scrambling algorithm identical to said programming station scrambling algorithm;

c. said programming station applying said scrambling algorithm to said programming data bits, producing security/randomization bits which are appended to said programming data bits, forming an outgoing programming message having programming data bits and appended security bits;

d. transferring said outgoing programming message from said programming station to said sensor, forming an incoming programming message to said sensor;

e. said sensor applying said scrambling algorithm in said memory to said incoming data bits in said incoming programming message, providing a scrambling result;

g. comparing said scrambling result to the security bits appended to said programming data bits in said incoming programming message;

h. upon a correct match of said scrambling result with said security bits, said transmitter accepting said programming data bits in said incoming programming message as from a valid, secure programmer;

g. programming said programming station sending a coded JAM command to said sensor, said sensor comparing said JAM command to said programming message and, upon verifying a match, said sensor permanently latching said jam command into a flip-flop in such a manner as to logically disconnect the programming connection so that future incoming programming command will be ignored.

2. The method of claim 1 whereby the linking of said programming station to said sensor is accomplished magnetically or optically.

3. The method of claim 1, whereby said scrambling algorithm may be alterable.

4. The method of claim 1 wherein there is provided the additional step in step "c" of said programming station, encrypting said programming data bits.

5. The method of claim 4 wherein there is provided the additional step in step "e" of said sensor decrypting said programming data bits.

6. The method of claim 1, wherein there is included after step "h" the additional step of said transmitter sending a verification burst to said programming station.

7. The method of programming a sensor in a secure manner, comprising the steps of:

a. providing a programming station containing in memory sensor identification and function information comprising programming data bits, said programming station further containing in memory a scrambling algorithm;

b. providing an sensor containing in memory a scrambling algorithm identical to said programming station scrambling algorithm;

c. said programming station applying said scrambling algorithm to said programming data bits, producing security/randomization bits which are appended to said programming data bits, forming an outgoing programming message having programming data bits and appended security bits;

d. transferring said outgoing programming message from said programming station to said sensor, forming an incoming programming message to said sensor;

e. said sensor applying said scrambling algorithm in said memory to said incoming data bits in said incoming programming message, providing a scrambling result;

g. comparing said scrambling result to the security bits appended to said programming data bits in said incoming programming message;

h. upon a correct match of said scrambling result with said security bits, said transmitter accepting said programming data bits in said incoming programming message as from a valid, secure programmer;

g. said programming station sending a coded JAM command to said sensor, said sensor comparing said JAM command compared to the incoming programming message and, upon verifying a match, said sensor initiating a means to disconnect the programming connection, preventing further programming of said sensor.

8. The method of claim 7 whereby the linking of said programming station to said sensor is accomplished magnetically or optically.

9. The method of claim 7, whereby said scrambling algorithm may be alterable.

10. The method of claim 7 wherein there is provided the additional step in step "c" of said programming station encrypting said programming data bits.

11. The method of claim 7 wherein there is provided the additional step in step "e" of said sensor decrypting said programming data bits.

12. The method of claim 7, wherein there is included after step "h" the additional step of said transmitter sending a verification burst to said programming station.

13. The method of programming a sensor in a secure manner, comprising the steps of:

a. providing sensor identification and function information comprising programming data bits;

b. applying a scrambling algorithm to said programming data bits, producing security/randomization bits, appending said security/randomization bits to said programming data bits, forming a programming message having programming data bits and security bits;

c. providing an sensor containing in memory a scrambling algorithm identical to said scrambling algorithm in step "b";

d. transferring said programming message to said sensor, forming an incoming programming message to said sensor;

e. said sensor applying said scrambling algorithm in said memory to said incoming programming data bits in said incoming programming message, providing a scrambling result;

g. comparing said scrambling result to the security bits appended to said programming data;

h. upon a correct match of said scrambling result with said security bits, said transmitter accepting said data bits in said incoming programming message as from a valid, secure programmer, i. sending a coded JAM command to said sensor, said sensor comparing said JAM command with said programming message and, upon verifying a match, said sensor permanently latching said jam command into a flip-flop in such a manner as to logically disconnect the programming connection so that future incoming programming command will be ignored.

14. The method of claim 13 whereby the linking of said programming station to said sensor is accomplished magnetically or optically.

15. The method of claim 13, whereby said scrambling algorithm may be alterable.

16. The method of claim 13, wherein there is provided the additional step in step "b" of encrypting said programming data bits.

17. The method of claim 13 wherein there is provided the additional step in step "e" of said sensor decrypting said encrypted programming data bits.

18. The method of claim 13, wherein there is included after step "h" the additional step of said transmitter sending a verification burst to the programmer.

19. The method of claim 13, said programming message in step "b" is stored on a bar code.

20. The method of claim 13, wherein said programming message in step "b" is stored on a magnetic strip.

21. The method of claim 13, wherein said programming station is portable.

22. The method of claim 13, wherein said programming station is part of a control panel.

23. The method of programming a sensor in a secure manner, comprising the steps of:

a. providing sensor identification and function information comprising programming data bits;

b. applying a scrambling algorithm to said programming data bits, producing security/randomization bits, appending said security/randomization bits to said programming data bits, forming a programming message having programming data bits and security bits;

c. providing an sensor containing in memory a scrambling algorithm identical to said scrambling algorithm in step "b";

d. transferring said programming message to said sensor, forming an incoming programming message to said sensor;

e. said sensor applying said scrambling algorithm in said memory to said incoming programming data bits in said incoming programming message, providing a scrambling result;

g. comparing said scrambling result to the security bits appended to said programming data;

h. upon a correct match of said scrambling result with said security bits, said transmitter accepting said data bits in said incoming programming message as from a valid, secure programmer, i. sending a coded JAM command to said sensor, said sensor comparing said JAM command with said programming message and, upon verifying a match, said sensor initiating a means to disconnect the programming connection, preventing further programming of said sensor.

24. The method of claim 23 whereby the linking of said programming station to said sensor is accomplished magnetically or optically.

25. The method of claim 23, whereby said scrambling algorithm may be alterable.

26. The method of claim 23, wherein there is provided the additional step in step "b" of encrypting said programming data bits.

27. The method of claim 23 wherein there is provided the additional step in step "e" of said sensor decrypting said encrypted programming data bits.

28. The method of claim 23, wherein there is included after step "h" the additional step of said transmitter sending a verification burst to the programmer.

29. The method of claim 23, said programming message in step "b" is stored on a bar code.

30. The method of claim 23, wherein said programming message in step "b" is stored on a magnetic strip.

31. The method of claim 23, wherein said programming station is portable.

32. The method of claim 23, wherein said programming station is part of a control panel.

33. A method of programming a sensor transmitter in a secure fashion, comprising the steps of:

a. placing a transmitter within a reception range of a receiver;

b. said receiver being set into a mode by which it can accept programming data via transmitted programming information from said transmitter;

c. providing secure programming means for preventing unauthorized programming of said transmitter;

d. said transmitter having a random number generator means for generating random numbers;

e. placing said transmitter in a programming mode, selectively generating a security/randomization bit for said transmitter by initiating said random number generator means, and designating said random number generated as said security/randomization bit, and transmitting said bit to said receiver as a programming message indicating a proposed device ID/address;

f. said receiver imputing said programming message and determining if said programming message corresponds to a preexisting device ID/address; wherein, g. if said programming message is acceptable, utilizing said programming message to provide a new device ID/address;

h. if said proposed device ID/address in said programming message is not acceptable, an appropriate indication is so made;

i. step e is repeated until step g is met, once met the transmitter is removed from said programming mode.

34. The method of programming a sensor/transmitter of claim 33, wherein after step "g" there is provided the additional step of said receiver inputting said transmission and appending said security/randomization bit to programming data including new device ID/address, forming a programming message, and transmitting said programming message to said transmitter.

35. The method of programming a sensor/transmitter of claim 33 wherein in step "e" there is included the extra step of providing a programming button for initializing said random number generator.

36. The method of programming a sensor/transmitter of claim 35 wherein, once the device ID/address is programmed with the transmitter, said programming button for generating said random number generator feature is configured to reprogram to allow said switch to be utilized to program the spread spectrum code or frequency channel or the like, by depressing said button in increments for selecting the desired channel.

37. The method of programming a sensor/transmitter of claim 35 wherein there is provided the additional step of adding means to disable the functionality of the programming button in order to prevent tampering with the transmitter.

38. The method of programming a sensor/transmitter of claim 33, wherein there is provided the additional step of said transmitter having provided therein a transmitter type code indicating the type of said transmitter, and the further step of transferring said transmitter type code from said transmitter to said receiver for programming of said receiver.

* * * * *